United States Patent
Brandin et al.

(10) Patent No.: US 11,958,484 B2
(45) Date of Patent: Apr. 16, 2024

(54) AUTONOMOUS DRIVING VEHICLE

(71) Applicant: Ningbo Geely Automobile Research & Development Co., Ltd., Ningbo (CN)

(72) Inventors: Magnus Brandin, Mölnlycke (SE); Per Landfors, Hisings Backa (SE)

(73) Assignee: Ningbo Geely Automobile Research & Dev. Co., Ltd., Ningbo (CN)

( * ) Notice: Subject to any disclaimer, the term of this patent is extended or adjusted under 35 U.S.C. 154(b) by 138 days.

(21) Appl. No.: 16/846,839

(22) Filed: Apr. 13, 2020

(65) Prior Publication Data

US 2020/0241523 A1 Jul. 30, 2020

Related U.S. Application Data

(63) Continuation of application No. PCT/CN2018/111269, filed on Oct. 22, 2018.

(30) Foreign Application Priority Data

Oct. 26, 2017 (EP) .................................... 17198618

(51) Int. Cl.
*B60W 30/12* (2020.01)
*B60W 40/02* (2006.01)
(Continued)

(52) U.S. Cl.
CPC ............ *B60W 30/12* (2013.01); *B60W 40/02* (2013.01); *B60W 40/109* (2013.01);
(Continued)

(58) Field of Classification Search
CPC ..... B60W 2050/0075; B60W 2552/10; B60W 2552/20; B60W 2552/30; B60W 2554/00;
(Continued)

(56) References Cited

U.S. PATENT DOCUMENTS 9,189,897 B1   11/2015  Stenneth
9,707,913 B1 *  7/2017  Ochiai ................. B60N 2/0248
(Continued)

FOREIGN PATENT DOCUMENTS

CN   101778753 A   7/2010
CN   102529966 A   7/2012
(Continued)

OTHER PUBLICATIONS

Extended European Search Report from corresponding European Application No. 17198618.5, dated May 7, 2018, 10 pages.
(Continued)

*Primary Examiner* — Jaime Figueroa
*Assistant Examiner* — Zachary Joseph Wallace
(74) *Attorney, Agent, or Firm* — Tucker Ellis LLP (57) ABSTRACT

An autonomous vehicle includes processor circuitry to control a lateral position of the autonomous vehicle during autonomous driving at least based on a default lateral position and a user interface arranged to receive an input indicative of an off-set of the lateral position from a user of the autonomous driving vehicle, wherein the processor circuitry is arranged to receive, from the user interface, information regarding the off-set of the lateral position of the autonomous driving vehicle during driving in the lateral position, calculate a maximum right and a maximum left off-set of the lateral position, calculate a dynamic off-set value based on the received off-set and the maximum right and the maximum left off-set, adjust the lateral position based on the off-set information, and control the lateral position at least based on the dynamic off-set value and the default lateral position of the autonomous driving vehicle.

18 Claims, 4 Drawing Sheets

(51) Int. Cl.
*B60W 40/109* (2012.01)
*G05D 1/00* (2006.01)
*G06F 3/01* (2006.01)
*G06V 20/56* (2022.01)
*B60W 60/00* (2020.01)

(52) U.S. Cl.
CPC ......... *G05D 1/0016* (2013.01); *G05D 1/0022* (2013.01); *G05D 1/0253* (2013.01); *G05D 1/0257* (2013.01); *G05D 1/0278* (2013.01); *G06F 3/01* (2013.01); *G06V 20/588* (2022.01); *B60W 60/0051* (2020.02); *B60W 2552/05* (2020.02); *B60W 2552/10* (2020.02); *B60W 2554/60* (2020.02); *B60W 2754/20* (2020.02); *G05D 2201/0213* (2013.01)

(58) Field of Classification Search
CPC ......... B60W 2555/20; B60W 2556/10; B60W 2556/50; B60W 2754/20
See application file for complete search history.

(56) References Cited

U.S. PATENT DOCUMENTS

| | | | |
|---|---|---|---|
| 11,354,616 B1* | 6/2022 | Fields | ................ G06Q 10/0639 |
| 2009/0299573 A1 | 12/2009 | Thrun | |
| 2010/0191421 A1 | 7/2010 | Nilsson | |
| 2011/0231063 A1 | 9/2011 | Kim | |
| 2012/0166032 A1 | 6/2012 | Lee | |
| 2012/0271500 A1 | 10/2012 | Tsimhoni | |
| 2013/0226406 A1 | 8/2013 | Ueda | |
| 2015/0246673 A1 | 9/2015 | Tseng | |
| 2017/0075355 A1 | 3/2017 | Micks | |
| 2017/0267287 A1 | 9/2017 | Takamatsu | |
| 2018/0141568 A1* | 5/2018 | Singhal | ................ G01S 13/865 |
| 2018/0141588 A1 | 5/2018 | Shimizu | |
| 2019/0039593 A1* | 2/2019 | Oyama | ................ B60W 10/20 |
| 2019/0294167 A1* | 9/2019 | Kutila | ................ G01C 21/3461 |
| 2020/0148205 A1* | 5/2020 | Yoshida | ................ G05D 1/0088 |
| 2020/0189583 A1* | 6/2020 | Tatourian | ................ G06F 16/29 |

FOREIGN PATENT DOCUMENTS

| | | |
|---|---|---|
| CN | 102745224 A | 10/2012 |
| CN | 106338988 A | 1/2017 |
| CN | 106940933 A | 7/2017 |
| DE | 102011076418 A1 | 11/2012 |
| JP | 2000198458 A | 7/2000 |
| JP | 2016084095 A | 5/2016 |
| WO | 2017022474 A1 | 9/2017 |

OTHER PUBLICATIONS

International Search Report and Written Opinion for corresponding Application No. PCT/CN2018/111269 dated Jan. 28, 2019, 9 pages.

* cited by examiner

AUTONOMOUS DRIVING VEHICLE

RELATED APPLICATION DATA

This application is a continuation of International Patent Application No. PCT/CN2018/111269 filed Oct. 22, 2018, which claims the benefit of European Patent Application No. 17198618.5, filed Oct. 26, 2017, the disclosures of which are incorporated herein by reference in their entireties.

FIELD OF THE INVENTION

The present invention relates to the field of autonomous driving vehicles. An autonomous driving vehicle is a vehicle that is capable of sensing its environment and navigating without input from the user/driver. It uses a variety of techniques to detect its surroundings, such as radar, laser light, GPS, odometer, and computer vision. Advanced control systems interpret the obtained sensory information to identify appropriate navigation paths, as well as obstacles and relevant signage. The vehicle may for example be a passenger car, truck, bus or construction machine, like a wheel loader or an articulated hauler.

BACKGROUND OF THE INVENTION

A challenge in making an autonomous driving vehicle is that the user should feel safe and have a pleasant ride when the vehicle is driven in the autonomous driving mode. One of the aspects that effect how the driver/user of the vehicle perceives the safety of the ride in the autonomous driving mode is the lateral position of the vehicle on the road. The autonomous driving vehicle continuously calculates and regulates the lateral position of the vehicle to ensure that the lateral position of the vehicle is safe. Unexpected obstacles in the path of the vehicle (e.g. pot holes, obstacles or vulnerable road users (VRUs)) and threats adjacent/close to current path of the vehicle (e.g. curbs, large vehicles, VRUs, risk of wild animals) are difficult for the autonomous driving vehicle to consider when deciding the lateral position of the vehicle. Even more difficult for the autonomous driving functionality is to take into consideration how the driver feels about the current situation when deciding the lateral position of the vehicle. In some situations, the user of the autonomous driving vehicle feels like the vehicle is driving too close to the centre of the road or too close to sides.

Thus, there is a need for the autonomous driving vehicle to take into account how the driver of the vehicle feels when driving in the autonomous mode.

SUMMARY OF THE INVENTION

It is known in the art that the autonomous driving vehicle controls the autonomous driving of the vehicle based on a number of pre-set, default settings.

An object of the present invention is to provide a method and a device, which seek to mitigate, alleviate, or eliminate one or more of the above-identified deficiencies in the art and disadvantages singly or in any combination.

The inventors have identified that there is a need for the user/driver of the autonomous driving vehicle to be able to adjust/correct the lateral position of the vehicle while using the autonomous driving functionality. In addition to this, there is also a need to over time teach/learn the autonomous driving vehicle what lateral position that is desirable for the specific driver/user in different situations.

In this disclosure, a solution to the problem outlined above is proposed. In the proposed solution, an autonomous driving vehicle, comprising at least one processor circuitry arranged to control a lateral position of the autonomous driving vehicle during autonomous driving of the autonomous driving vehicle at least based on a default lateral position of the autonomous driving vehicle, and at least one user interface arranged to receive an input indicative of an off-set of the lateral position of the autonomous driving vehicle from a user of the autonomous driving vehicle. The processor circuitry is arranged to receive, from the at least one user interface, information regarding the off-set of the lateral position of the autonomous driving vehicle during driving in the lateral position, calculate a maximum right and a maximum left off-set of the lateral position, calculate a dynamic off-set value based on the received off-set and the maximum right and the maximum left off-set, adjust the lateral position of the vehicle based on the off-set information, and control the lateral position of the autonomous driving vehicle at least based on the dynamic off-set value and the default lateral position of the autonomous driving vehicle.

By allowing the user of the autonomous driving vehicle to be able to change/modify the lateral position of the vehicle during autonomous driving, the user will feel safer and secure. The user could feel more secure since if he desires to change the lateral position based on his perception he could do so. For instance could it be due to that the driver might want to be closer to the centre of the road when having a rock wall along the side as compared to when having an open field to the side, even though the margins in the driving lane and the shoulder are the same.

Further, by allowing the vehicle to receive information of the desired lateral position of the vehicle from the user during autonomous driving, the perception of the ride of the user will be enhanced.

Further, by allowing the vehicle to use the received input to calculate a dynamic off-set value, the input from the user could be re-used and the lateral position of the vehicle could be better adapted to the desired lateral position of the vehicle without further input from the user. The dynamic off-set value is based on a combination of the maximum right and the maximum left off-set and the received off-set and the lateral position of the vehicle and is thus adapted to be a combination of the input from the user and the prerequisites of the surroundings of the vehicle.

By a dynamic off-set value is meant a value that is dependent on the input from the user in combination of the actual demands of the surroundings of the vehicle and that the off-set is not a fixed/static distance/length in meters.

According to an aspect the dynamic off-set value is a percentage of the maximum right and the maximum left off-set. By the dynamic off-set value being a percentage, the lateral position could be adapted to the desire of the user based on less input from the user.

According to an aspect the off-set information of the off-set of the lateral position comprise data of a distance from the default lateral position corresponding to the lateral position of the autonomous driving vehicle that the autonomous driving vehicle should be adjusted to. By obtaining the distance that the user of the vehicle would like to change the position to, the experience of the driving in the autonomous mode is even further enhanced.

According to an aspect the off-set information of the off-set of the lateral position comprise data of a lateral direction from the default lateral position corresponding to the lateral position of the autonomous driving vehicle that the autonomous driving vehicle should be adjusted to.

According to an aspect the received off-set information of the lateral position is limited to be between the maximum right and the maximum left off-set of the lateral position. By limiting the off-set to the maximum right and left off-set the security of driving the autonomous driving vehicle in the autonomous mode is not affected by the user changing the lateral position of the vehicle.

According to an aspect the at least one processor circuitry is arranged to continuously set the maximum right and the maximum left off-set of the lateral position at least based on data generated by the autonomous driving vehicle. By continuously set the maximum right and left off-set, the lateral position of the vehicle could be adapted to the specific conditions of the road and the flexibility of how the lateral position of the vehicle could be off-set is increased.

According to an aspect the data generated by the autonomous driving vehicle is one or more of a lane width, a shoulder width, a road curvature, curbs, visibility, a potential threat in the path in the driving lane or adjacent to the lane, a geographical position, a speed limit of the road, hidden curves, crests hiding oncoming traffic, existence of oncoming traffic and road conditions.

According to an aspect the data generated by the autonomous driving vehicle is generated by one or more of a sensor, a radar, a laser light, a positioning system such as a GPS, an odometer and a computer vision system.

According to an aspect the at least one user interface is one or more of a steering wheel of the vehicle, a touch screen, a gesture sensor, a voice sensor, a motion sensor, buttons on the steering wheel and buttons.

According to an aspect the user interface is configured to receive the input indicative of the off-set of the lateral position in a number of discrete steps.

According to an aspect the user interface is configured to receive the input indicative of the off-set of the lateral position as continuous steps.

According to an aspect the processor circuitry is arranged to replace the default lateral position of the autonomous driving vehicle in a memory to be the default lateral position of the autonomous driving vehicle adjusted by dynamic off-set value. By replacing/updating the default lateral position the user experience for the user of the autonomous driving vehicle is enhanced since he does not need to change/correct the lateral position of the autonomous driving vehicle every time and the autonomous driving vehicle will learn the lateral position of the user that he feels most safe with.

According to an aspect the processor circuitry is arranged to store the input indicative of the off-set of the lateral position the dynamic off-set value received from a specific user of the autonomous driving vehicle in the memory as the default lateral position of the autonomous driving vehicle for the specific user of the autonomous driving vehicle. By storing the desired lateral position for a specific user, different users driving the same vehicle does not need to start from another user's preferences.

According to an aspect the at least one processor circuitry is arranged to store a plurality of off-set information, which are associated to different driving scenarios determined at least based on data generated by the autonomous driving vehicle.

According to an aspect the processor circuitry is arranged to store the input indicative of the off-set of the lateral position and/or the dynamic off-set value received from a user of the autonomous driving vehicle for one or more of a specific geographical position of the autonomous driving vehicle, a type of road, the width of the road, number of lanes, roundabouts, visibility, time, weather, a presence of a roadside, driving in ques in the memory as the default lateral position of the vehicle for the specific geographical position of the vehicle. By adding and storing more information to the input indicative of the off-set of the lateral position, different lateral positions could be used for different conditions without the user needs to change the lateral position.

According to an aspect the user interface is arranged to communicate a geographical position of the autonomous driving vehicle to a cloud service and receive, from the cloud service, input indicative of a geographical off-set of the lateral position and/or the dynamic off-set value, wherein the input indicative of the geographical off-set of the lateral position is based on a number of drivers desired lateral positions and/or the dynamic off-set value for the given geographical position and the processor circuitry is arranged to adjust the lateral position of the autonomous driving vehicle during autonomous driving based on a combination of the default lateral position, the off-set of the lateral position, the dynamic off-set value and the geographical off-set of the lateral position. By sharing information and receiving information for the off-set of a specific geographical position the possibility that the user feels safe and secure with the lateral position set by the autonomous driving vehicle itself increases and the need of input from the user is lowered.

According to an aspect the user interface is configured to receive an input indicative of the satisfaction of the lateral position from the user of the autonomous driving vehicle, and wherein the processor circuitry is configured to further base the lateral position of the autonomous driving vehicle on the input indicative of the satisfaction of the lateral position. By receiving input from the user also of the satisfaction of the lateral position the processor circuitry get information also of when the user is happy (or unhappy) with a lateral position and would like to continue to use such a position and also use this input to amplify the lateral positions that is perceived as satisfactory.

In another aspect of the proposed solution a method for controlling a lateral position of an autonomous driving vehicle is disclosed. The autonomous driving vehicle comprises at least one processor circuitry and a user interface. The method comprising the steps of: controlling, by the processing circuitry, the lateral position of the autonomous driving vehicle, receiving, via the user interface, during autonomous driving of the autonomous driving vehicle an input indicative of an off-set of the lateral position of the autonomous driving vehicle from a user of the autonomous driving vehicle, calculating a maximum right and a maximum left off-set of the lateral position, calculating a dynamic off-set value based on the received off-set and the maximum right and the maximum left off-set, adjusting, by the processing circuitry, the lateral position of the autonomous driving vehicle based on information regarding the off-set from a default lateral position of the autonomous driving vehicle, and controlling the lateral position of the autonomous driving vehicle at least based on the dynamic off-set value and the default lateral position of the autonomous driving vehicle.

According to an aspect the method further comprising: receiving, via the user interface, during autonomous driving of the autonomous driving vehicle an input indicative of the satisfaction of the lateral position from the user of the autonomous driving vehicle, and wherein the step of controlling the lateral position of the autonomous driving vehicle further is based on the input indicative of the satisfaction of the lateral position.

According to an aspect the method further comprising: replacing, in a memory, the default lateral position of the autonomous driving vehicle with the lateral position corresponding to the input indicative of the off-set of the default lateral position of the autonomous driving vehicle.

Generally, all terms used in the claims are to be interpreted according to their ordinary meaning in the technical field, unless explicitly defined otherwise herein. All references to "a/an/the [element, device, component, means, etc.]" are to be interpreted openly as referring to at least one instance of said element, device, component, means, etc., unless explicitly stated otherwise. Further, by the term "comprising" it is meant "comprising but not limited to" throughout the application.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments and aspects.

DETAILED DESCRIPTION

The present invention will now be described more fully hereinafter with reference to the accompanying drawings, in which exemplary embodiments and aspects of the invention are shown. The invention may, however, be embodied in many different forms and should not be construed as limited to the embodiments and aspects set forth herein; rather, these embodiments and aspects are provided for thoroughness and completeness. Like reference characters refer to like elements throughout the description. The drawings are not necessarily to scale and certain features may be exaggerated in order to better illustrate and explain the exemplary embodiments of the present invention.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

In some implementations and according to some aspects of the disclosure, the functions or steps in the method can occur out of the order noted in the operational illustrations. For example, two steps shown in succession can in fact be executed substantially concurrently or the steps can sometimes be executed in the reverse order, depending upon the functionality/acts involved.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Although the invention will be described in relation to a car, the invention is not restricted to this particular vehicle, but may as well be installed in other type of vehicles such as minivans, recreational vehicles, off-road vehicles, trucks, buses or the like.

Figure 1:
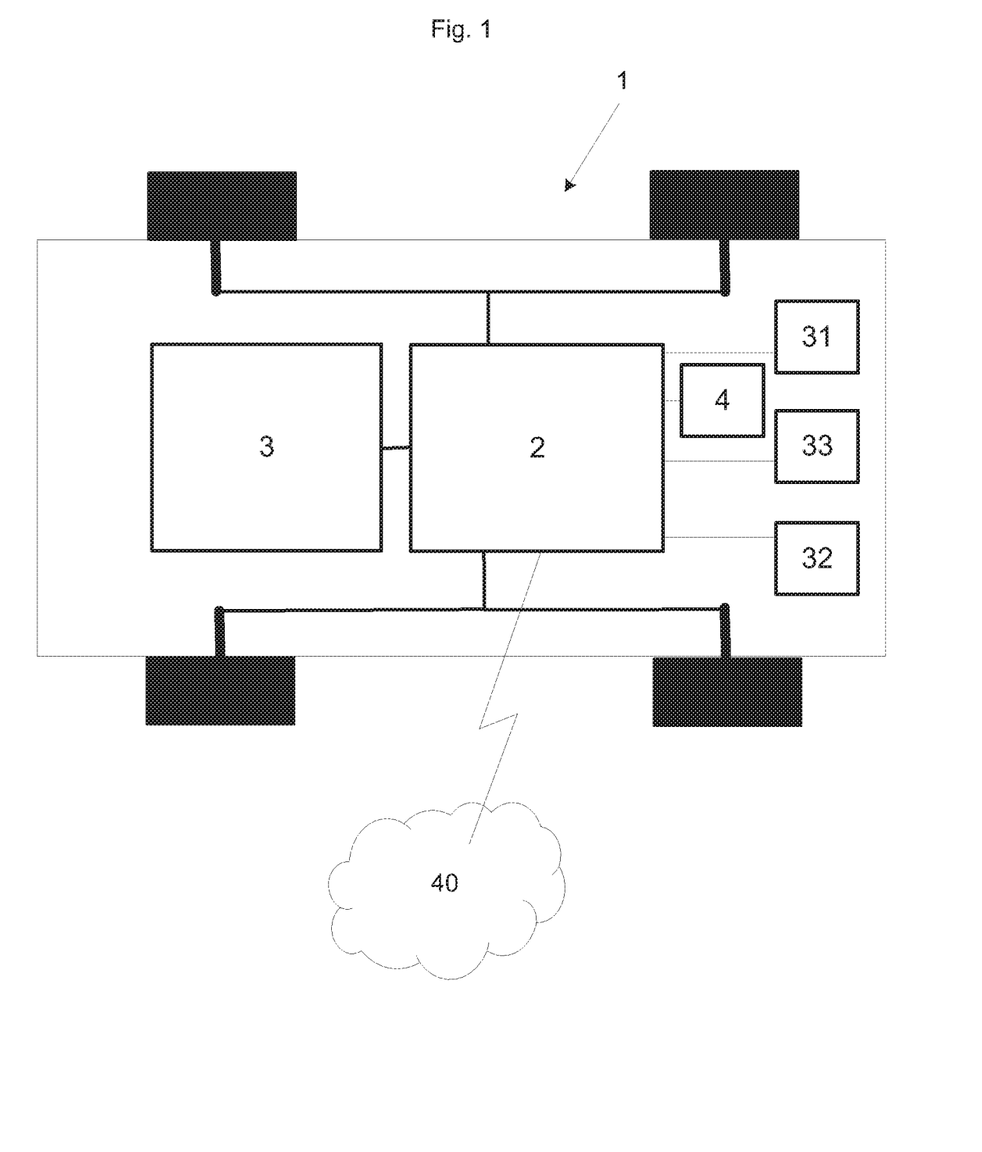
FIG. 1 discloses a schematic view of an autonomous driving vehicle according to the invention.

In FIG. 1, to which now is referred to, disclose schematic view of an autonomous driving vehicle 1 in the form of a passenger car. The autonomous driving vehicle 1 comprises at least one processor circuitry 2 and a user interface 3. According to an aspect the autonomous driving vehicle 1 further comprise a memory 4, a sensor 31, a radar 32, a laser light, a positioning system such as a GPS 33, an odometer (not disclosed) and a computer vision system (not disclosed).

The at least one processor circuitry 2 is connected to the user interface 3. According to an aspect the at least one processor circuitry 2 is connected to the memory 4. According to an aspect the at least one processor circuitry 2 is connected to the sensor 31, the radar 32, the laser light, the GPS 33, the odometer and/or the computer vision system. The processing circuitry 2 can be a Central Processing Unit, CPU, or any processing unit carrying out instructions of a computer program or operating system.

The autonomous driving vehicle 1 is configured to sense its environment and navigating without the need of input from the user. According to an aspect the autonomous driving vehicle 1 is connected to a cloud service 40. The autonomous driving vehicle 1 as such will not be described in detail here.

According to an aspect the at least one user interface 3 is one or more of a steering wheel of the vehicle, a touch screen, a gesture sensor, a voice sensor, a motion sensor, buttons on the steering wheel and buttons.

Figure 2:
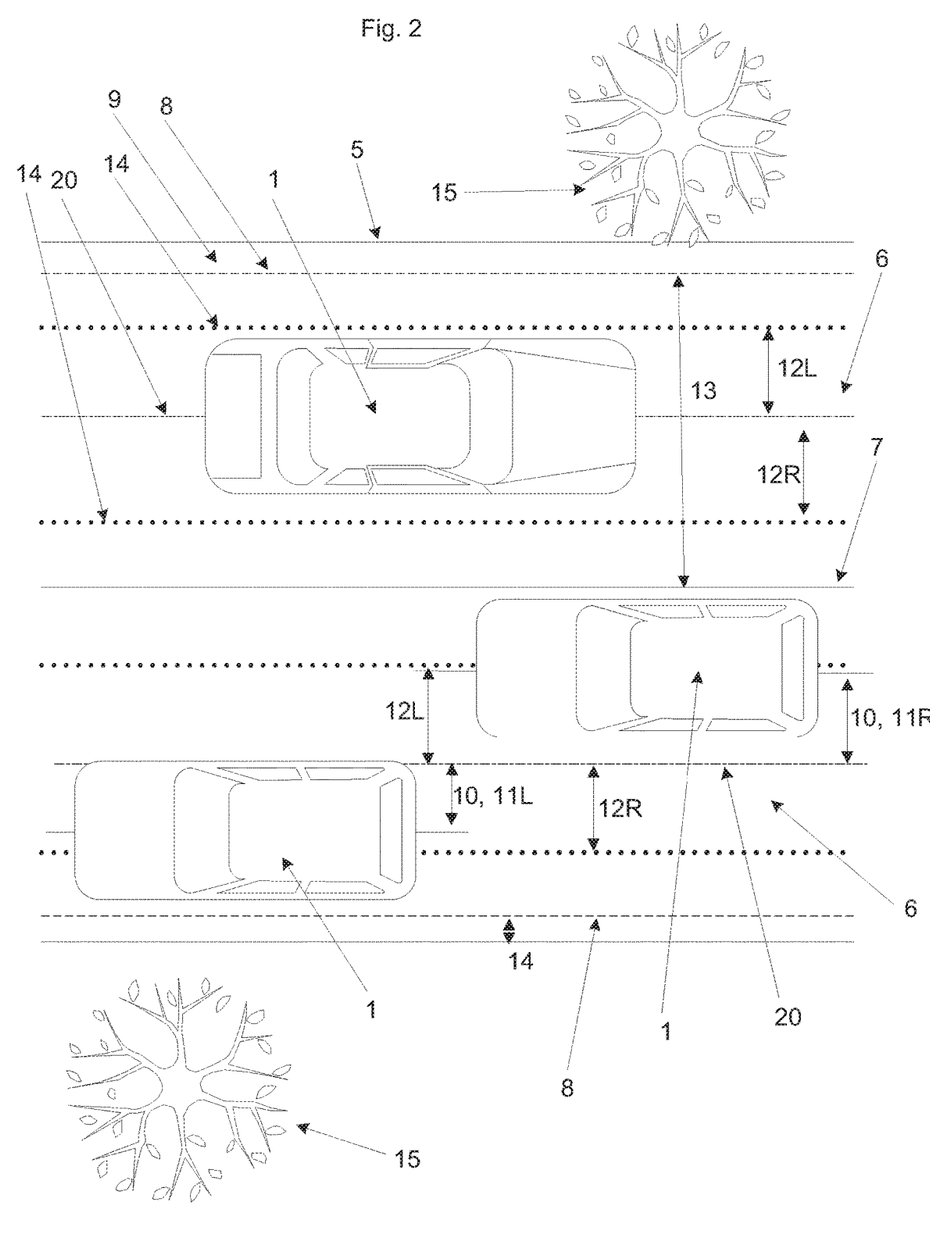
FIG. 2 discloses a schematic view of a road, a roadside and three autonomous driving vehicles on the road in a first position.
Figure 3:
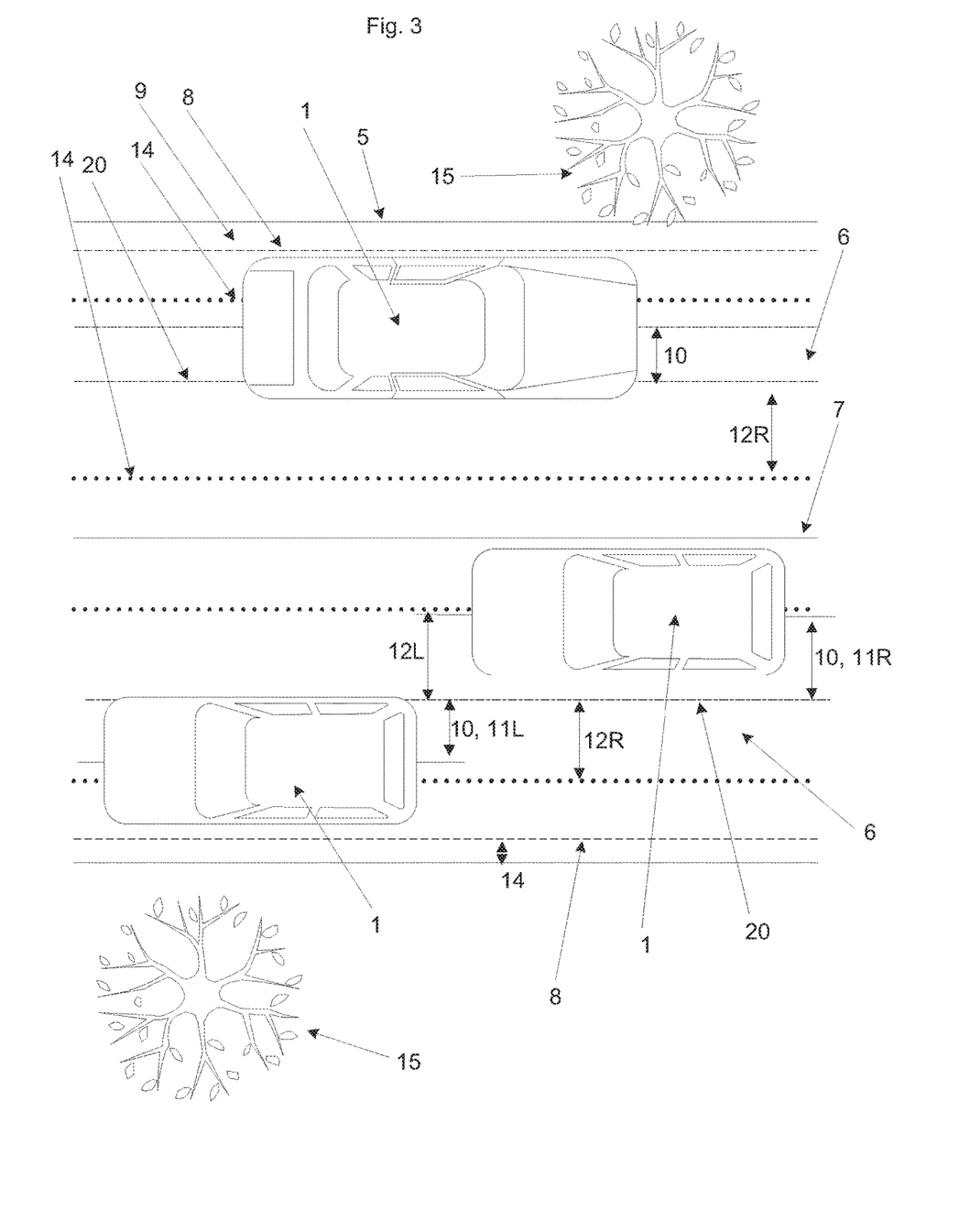
FIG. 3 discloses the schematic view of the road and the roadside in FIG. 2 and the three autonomous driving vehicles on the road in a second position.

FIGS. 2 and 3, to which now is referred to, discloses a road 5 and three autonomous driving vehicles 1 that is driving on the road 5.

The road 5 comprises a driving lane 6 going in one direction and a driving lane 6 going in the opposite direction. The driving lanes 6 are defined by a centre line 7 in the middle of the road 5 and a roadside line 8 on the edge of the road 5. The roadside line 8 further defines a roadside/shoulder 9.

A first and a second obstacle 15, here in the form of trees 15, are present close to the road 5.

The at least one processor circuitry 2 is arranged to control the lateral position of the autonomous driving vehicle 1 on the road 5 during autonomous driving of the autonomous driving vehicle 1 on the road 5.

A default lateral position 20 of the autonomous driving vehicle 1 is represented by the line 20. The default lateral position 20 is the lateral position on the driving lane 6 that the processor circuitry 2 will drive the autonomous driving vehicle 1 along until it receives input from the user of the autonomous driving vehicle 1.

The at least one user interface 3 arranged to receive an input indicative of an off-set 10 of the lateral position of the autonomous driving vehicle 1 from a user of the autonomous driving vehicle 1. The off-set 10 is the change in lateral position of the autonomous driving vehicle 1 in view of the default lateral position 20. According to an aspect the off-set 10 is the change in lateral position of the autonomous driving vehicle 1 in view of the default lateral position 20 at the position of the autonomous driving vehicle 1.

According to an aspect the user interface 3 is configured to receive the input indicative of the off-set 10 of the lateral position in a number of discrete steps. According to an aspect the user interface 3 is configured to receive the input indicative of the off-set 10 of the lateral position as continuous steps.

According to an aspect the off-set information of the off-set 10 of the lateral position comprise data of a distance 11L, 11R from the default lateral position 20. The data of the distance 11L, 11R corresponds to the lateral position of the autonomous driving vehicle 1 that the autonomous driving vehicle 1 should be adjusted to. According to an aspect the off-set information of the off-set 10 of the lateral position comprise data of a lateral direction 11R, 11L from the default lateral position 20. The data of the lateral direction corresponding to the lateral position of the autonomous driving vehicle 1 that the autonomous driving vehicle 1 should be adjusted to. The processor circuitry 2 is arranged to receive the off-set information regarding the off-set 10 of the lateral position of the autonomous driving vehicle 1 from the at least one user interface 3. The processing circuitry 2 is arranged to receive the off-set information during driving in the autonomous driving mode. The processing circuitry 2 is arranged to adjust the lateral position of the autonomous driving vehicle 1 based on the off-set information. The processing circuitry 2 is arranged to calculate a maximum right 12R and a maximum left 12L off-set 10 of the lateral position. The processing circuitry 2 is arranged to calculate a dynamic off-set value based on the received off-set 10 and the maximum right 12R and the maximum left 12L off-set 10. The processing circuitry 2 is arranged to control the lateral position of the autonomous driving vehicle at least based on the dynamic off-set value and the default lateral position 20 of the autonomous driving vehicle 1.

According to an aspect the dynamic off-set value is a percentage of the maximum right 12R and the maximum left 12L off-set 10.

According to an aspect the dynamic off-set value is a function of the maximum right 12R and the maximum left 12L off-set 10 and specific features/data of the surroundings of the autonomous driving vehicle 1.

By a dynamic off-set value is meant a value that is dependent on the input from the user in combination of the actual demands of the surroundings of the vehicle and that the off-set is not a fixed distance or length in meters.

The lateral position of the autonomous driving vehicle 1 is thus changed to the off-set lateral position of the autonomous driving vehicle, as disclosed in FIG. 3 by the upper autonomous driving vehicles 1 in relation to its position disclosed in FIG. 2. The lateral position of the autonomous driving vehicle 1 is further controlled based on the dynamic off-set value and the default lateral position 20 as the autonomous driving vehicle 1 continuous to travel on the road.

The processor circuitry 2 is according to an aspect arranged to set the maximum right 12R and the maximum left 12L off-set 10 of the lateral position.

The maximum right 12R and the maximum left 12L off-set 10 of the lateral position are the end positions 14 between which the lateral position should be altered between. According to an aspect the maximum right 12R and the maximum left 12L off-set 10 of the lateral position are the end positions 14 between which the autonomous driving vehicle 1 could travel along based on the surroundings of the vehicle. According to an aspect the received off-set information of the lateral position is limited to be between the maximum right 12R and the maximum left 12L off-set 10 of the lateral position. The distance that the user could change the lateral position of the autonomous driving vehicle 1 between is thus limited by the maximum right 12R and the maximum left 12L off-set 10 of the lateral position.

According to an aspect the at least one processor circuitry 2 is arranged to continuously set the maximum right 12R and the maximum left 12L off-set 10 of the lateral position at least based on data generated by the autonomous driving vehicle 1.

According to an aspect the received off-set 10 should be smaller than the maximum right 12R and the maximum left 12L off-set 10.

The data generated by the autonomous driving vehicle 1 is according to an aspect generated by the sensor 31, the radar 32, the laser light, the positioning system such as a GPS 33, the odometer and/or the computer vision system.

According to an aspect the data generated by the autonomous driving vehicle 1 is one or more of the driving lane width 13, a road side 14, a road curvature, curbs, visibility, a potential threat in the path in the lane or adjacent to the lane 15, a geographical position, a speed limit of the road, hidden curves, crests hiding oncoming traffic, existence of oncoming traffic and road conditions.

According to an aspect the processor circuitry 2 is arranged to store the input indicative of the off-set 10 and/or the dynamic off-set value of the lateral position received from a specific user of the autonomous driving vehicle 1 in the memory 4 as the default lateral position 20 of the autonomous driving vehicle 1 for the specific user of the autonomous driving vehicle 1.

According to an aspect the processor circuitry 2 is arranged to store the input indicative of the off-set 10 and/or the dynamic off-set value of the lateral position received from a user of the autonomous driving vehicle 1 for one or more of a specific geographical position of the autonomous driving vehicle 1, a type of road, the width of the road, number of lanes, roundabouts, visibility, time, weather, a presence of a roadside, driving in ques in the memory as the default lateral position of the vehicle for the specific geographical position of the vehicle.

According to an aspect the user interface 3 is arranged to communicate a geographical position of the autonomous driving vehicle 1 to the cloud service 40 and receive, from the cloud service 40, input indicative of a geographical off-set and/or the dynamic off-set value of the lateral position, wherein the input indicative of the geographical off-set and/or the dynamic off-set value of the lateral position is based on a number of drivers desired lateral positions for the given geographical position and the processor circuitry 2 is arranged to adjust the lateral position 20 of the autonomous driving vehicle 1 during autonomous driving based on a combination of the default lateral position 20, the off-set 10 of the lateral position and/or the geographical off-set of the lateral position.

According to an aspect at least one processor circuitry 2 is arranged to control the autonomous driving of the autonomous driving vehicle 1 at least based on data generated by the vehicle 1 and on a number of default parameters stored in the memory 4. According to an aspect the number of default parameters at least comprises a lateral parameter of a default lateral position of the vehicle 1.

According to an aspect the processor circuitry 2 is arranged to replace the default lateral position 20 of the autonomous driving vehicle 1 in the memory 4 to be the adjusted lateral position of the autonomous driving vehicle 1. According to an aspect the processor circuitry 2 is arranged to replace the default lateral position 20 of the autonomous driving vehicle 1 in the memory 4 to be the default lateral position 20 of the autonomous driving vehicle 1 adjusted by dynamic off-set value.

According to an aspect the user interface 4 is configured to receive an input indicative of the satisfaction of the lateral position from the user of the autonomous driving vehicle 1. According to an aspect the processor circuitry 2 is configured to further base the lateral position of the autonomous driving vehicle on the input indicative of the satisfaction of the lateral position. By receiving input from the user also on the satisfaction of the lateral position the processor circuitry get information also of when the user is happy with a lateral position and would like to continue to use such a position and also use this input to amplify the lateral positions that is perceived as satisfactory.

According to an aspect the input indicative of the satisfaction of the lateral position is that the user is satisfied or not satisfied. According to an aspect the input indicative of the satisfaction of the lateral position is a rating of how satisfied the user is.

Figure 4:
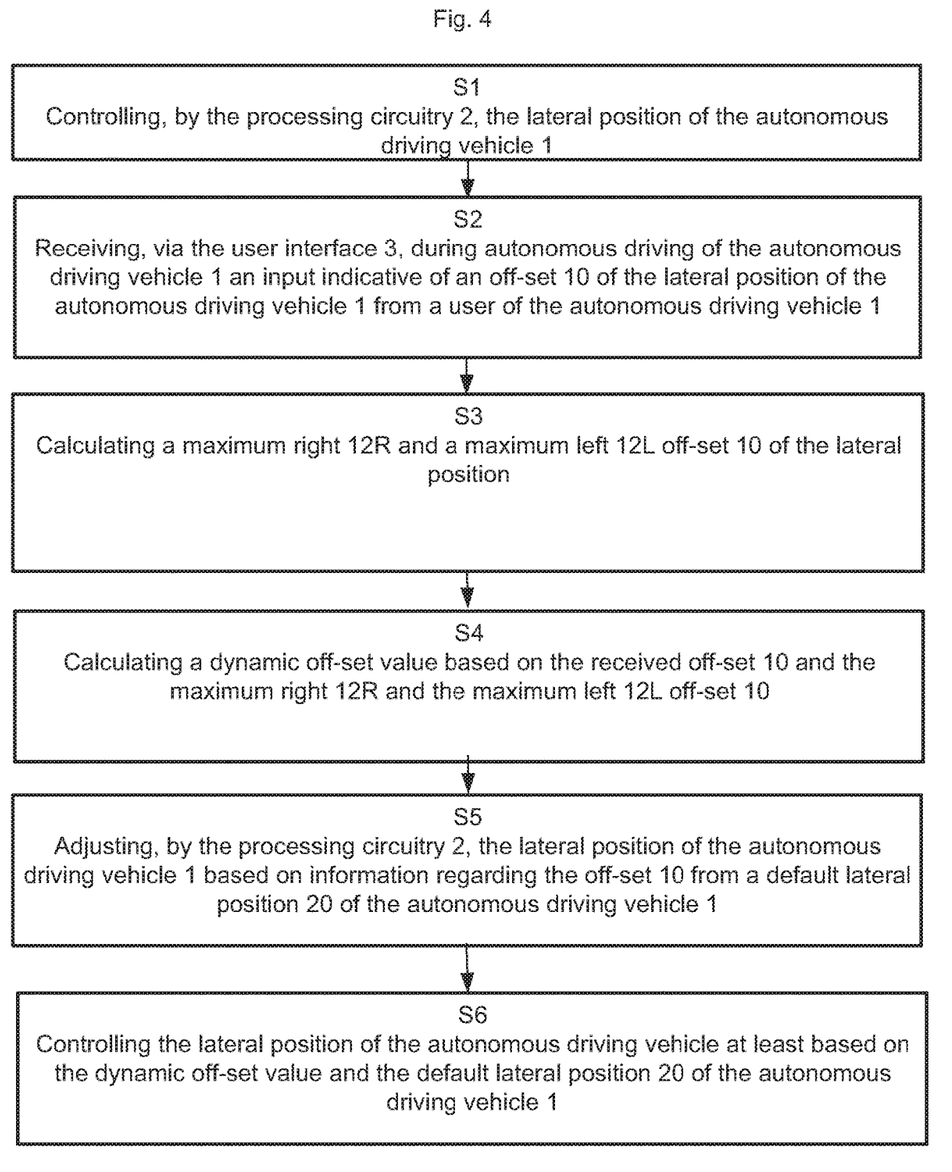
FIG. 4 discloses a flow chart of the method steps according to an aspect of the invention.

Hereafter a method of controlling the lateral position of the autonomous driving vehicle 1 will be described in more detail with reference to FIG. 4. A user of the autonomous driving vehicle 1 drives the vehicle 1 along a driving lane 7. The user thereafter initiates the autonomous driving mode of the vehicle 1 and the vehicle 1 starts to drive in the autonomous driving mode without a need for any input from the user. The processor circuitry 2 will drive the vehicle 1 along the default lateral position 20. Put in another way, the processing circuitry 2 are controlling S1 the lateral position of the autonomous driving vehicle 1 on the road 5.

If the user is of the opinion that the default lateral position 20 is not a desired lateral position to be driving in, the user can change the lateral position of the vehicle without exiting the autonomous driving mode.

The user interacts with the user interface 3 and gives input to the user interface 3 indicative of the off-set of the lateral position that the user would like to move the vehicle 1 to. According to an aspect the input could be that the autonomous driving vehicle 1 should be positioned a certain distance o the right or to the left of the default lateral position.

The user interface 3 is receiving S2, during autonomous driving of the autonomous driving vehicle, the input indicative of the off-set 10 of the lateral position of the autonomous driving vehicle 1 from the user of the autonomous driving vehicle 1. The user interface 3 receives the information during the vehicle 1 is driving in the autonomous driving mode and without exiting said autonomous driving mode.

The user interface 3 sends the input indicative of the off-set 10 of the lateral position of the autonomous driving vehicle 1 to the processing circuitry 2.

The processing circuitry 2 receives the input indicative of the off-set 10 of the lateral position of the autonomous driving vehicle 1.

The processing circuitry 2 calculates S3 a maximum right 12R and a maximum left 12L off-set 10 of the lateral position.

The processing circuitry 2 calculates S4 a dynamic off-set value based on the received off-set 10 and the maximum right 12R and the maximum left 12L off-set 10.

The lateral position of the autonomous driving vehicle 1 is adjusted S5 by the processing circuitry 2, based on information regarding the off-set 10 from a default lateral position 20 of the autonomous driving vehicle 1.

The lateral position of the autonomous driving vehicle 1 is controlled S6 by the processing circuitry 2 at least based on the dynamic off-set value and the default lateral position 20 of the autonomous driving vehicle 1.

The method thus makes it possible for a user to change the lateral position of the autonomous driving vehicle 1 during autonomous driving and without exiting driving in the autonomous driving mode. The method further makes it possible for the processing circuitry 2 to use the input from the user to dynamically control the lateral position of the autonomous driving vehicle 1 based on one input from the user.

As an example, if the user interface 3 receives input of that the user would like to change the lateral position to be 0.5 meter to the right of the default lateral position 20 that the autonomous driving vehicle 1 is travelling along and the maximum right 12R off-set 10 is 2 meters and the maximum left 12L off-set 10 is 1 meter for the position of the autonomous driving vehicle 1 in that the input is received. The dynamic off-set value is according to an aspect calculated to be 25% (0.5 m/2 m=0.25) of the maximum right 12R off-set 10. As the autonomous driving vehicle 1 travels further and its surroundings changes, also the maximum right 12R off-set 10 for the specific position changes. If the maximum right 12R off-set 10 in this later position is 1 meter, the off-set of the lateral position 20 of the autonomous driving vehicle 1 will be controlled by the processor circuitry 2, based on the dynamic off-set value of 25% and the maximum right 12R off-set 10 of 1 m, to be 25% of 1 m to the right of the default lateral position 20, i.e. the processor circuitry 2 will control the autonomous driving vehicle 1 to travel 25 cm to the right of the default lateral position.

If the user instead desires to position the vehicle more to the left on the road. The user interface 3 receives input of that the user would like to change the lateral position to be 1 meter to the left of the default lateral position 20 that the autonomous driving vehicle 1 is travelling along and he maximum right 12R off-set 10 is 2 meters and the maximum left 12L off-set 10 is 1 meter for the position of the autonomous driving vehicle 1 in that the input is received. The dynamic off-set value is according to an aspect calculated to be 100% (1/1 m=1) of the maximum left 12L off-set 10. As the autonomous driving vehicle 1 travelling further and its surroundings changes, also the maximum left 12L off-set 10 for the specific position changes. If the maximum left 12L off-set 10 in this later position is 2 meter, the off-set of the lateral position 20 of the autonomous driving vehicle 1 will be controlled by the processor circuitry 2, based on the dynamic off-set value of 100% and the maximum right 12L off-set 10, to be 100% of 2 m to the left of the default lateral position 20, i.e. the processor circuitry 2 will control the autonomous driving vehicle 1 to travel 2 m to the left of the default lateral position.

Further, if a number of trees 15 are identified at the left roadside by the autonomous driving vehicle 1 and the processing circuitry 2 earlier has received input of that the user does not like to travel close to trees, the dynamic off-set value could be set to be 50%. As the autonomous driving vehicle 1 approached such a position the processor circuitry 2 will use the dynamic off-set value of 50% instead of the 100% and position the vehicle 1 m left of the default off-set position.

According to an aspect the method further comprise: receiving, via the user interface 3, during autonomous driving of the autonomous driving vehicle 1 an input indicative of the satisfaction of the lateral position from the user of the autonomous driving vehicle 1, and wherein the step of controlling S7 the lateral position of the autonomous driving vehicle further is based on the input indicative of the satisfaction of the lateral position. The method thus makes it possible for a user to input feedback that he desires a lateral position at certain positions to be repeated or amplified or on the contrary that some positions should not be repeated or amplified.

According to an aspect the method comprise replacing, in the memory 4, the default lateral position 20 of the autonomous driving vehicle 1 with the lateral position corresponding to the input indicative of the off-set 10 of the default lateral position 20 of the autonomous driving vehicle 1.

According to an aspect the user adjust the lateral position by steering the vehicle to the desired position. Put in another way, the user interface is the steering wheel of the autonomous driving vehicle 1 and the input indicative of the off-set 10 of the lateral position of the autonomous driving vehicle 1 is the movement of the steering wheel. According to an aspect the user input could be a combination of input on different user interfaces 3. According to an aspect the user input is received as a combination of the user steering the wheel and pressing a button.

According to an aspect, if the user would like to adjust the lateral position of the vehicle more than the maximum allowed lateral adjustment, the driver will feel in the steering wheel that the limit has been reached. If the driver, however, continuous to apply a torque on the steering wheel, the autonomous driving mode will ramp out and the user takes over the lateral control. According to an aspect the feedback to the driver could be one or more of a sound, a light, tactile or any combination thereof.

According to an aspect an immediate or upcoming threat will override the lateral position set by the user.

According to an aspect the processing circuitry 2 will set the lateral position to the default lateral position 20 when entering a new road. According to an aspect the processing circuitry 2 will set the lateral position to the default lateral position 20 when entering new conditions. According to an aspect the conditions is one or more of a specific geographical position of the autonomous driving vehicle 1, a type of road, the width of the road, number of lanes, roundabouts, visibility, time, weather, a presence of a roadside, driving in ques in the memory as the default lateral position of the vehicle for the specific geographical position of the vehicle According to an aspect the processing circuitry 2 comprise machine learning functionality. The processing circuitry 2 learns the user's desired lateral position in relation to surrounding conditions and automatically adjusts to it to increase the satisfaction of the user, leading to less manual adjustments. According to an aspect the surrounding conditions is one or more of threats, light conditions, road types, geographical position, road conditions etc.

An example could be that the processing circuitry 2 learns that the user prefers to have a lateral position that is off-set to the left 12L of the default lateral position 20 when overtaking a truck on the left side. Another example could be that the processing circuitry 2 learns that the user prefers to position the vehicle 1 to the center of the road when driving in darkness on a geographically specific unlit country road.

According to an aspect the adjusted lateral position, including a geographical position can be communicated to the cloud service 40 where several user desired lateral positions are collected and weighed together. In turn, the processing circuitry 2 receives a predicted suitable geographical lateral position for a given geographical position, which can be used to improve the lateral position of the autonomous driving vehicle even further.

According to an aspect the processor circuitry 20 is arranged to receive, from the cloud service 40, information regarding the off-set 10 of the lateral position of the autonomous driving vehicle 1 during driving in the lateral position based on a default lateral position 20 of the autonomous driving vehicle 1 and to adjust the lateral position of the vehicle based on the off-set information. The information could be supplied to the cloud service 40 and to the autonomous driving vehicle 1 from a person or system monitoring the traffic and/or the driving of the autonomous driving vehicle 1 from a remote position.

According to an aspect the processor circuitry 20 is arranged to receive, from the cloud service 40, an updated default lateral position 20 of the autonomous driving vehicle 1 and to replace the default lateral position 20 with the updated default lateral position 20.

Although the invention has been described in relation to specific combinations of components, it should be readily appreciated that the components may be combined in other configurations as well which is clear for the skilled person when studying the present application. Thus, the above description of the example embodiments of the present invention and the accompanying drawings are to be regarded as a non-limiting example of the invention and the scope of protection is defined by the appended claims. Any reference sign in the claims should not be construed as limiting the scope.

The person skilled in the art realizes that the present invention by no means is limited to the preferred embodiments described above. On the contrary, many modifications and variations are possible within the scope of the appended claims.

The description of the aspects of the disclosure provided herein has been presented for purposes of illustration. The description is not intended to be exhaustive or to limit aspects of the disclosure to the precise form disclosed, and modifications and variations are possible in light of the above teachings or may be acquired from practice of various alternatives to the provided aspects of the disclosure. The examples discussed herein were chosen and described in order to explain the principles and the nature of various aspects of the disclosure and its practical application to enable one skilled in the art to utilize the aspects of the disclosure in various manners and with various modifications as are suited to the particular use contemplated. The features of the aspects of the disclosure described herein may be combined in all possible combinations of methods, apparatus, modules, systems, and computer program products. It should be appreciated that the aspects of the disclosure presented herein may be practiced in any combination with each other.

It should be noted that the word "comprising" does not necessarily exclude the presence of other elements or steps than those listed. It should further be noted that any reference signs do not limit the scope of the claims.

The invention claimed is:

1. An autonomous driving vehicle, comprising at least one processor circuitry, arranged to control a lateral position of the autonomous driving vehicle during autonomous driving of the autonomous driving vehicle at least based on a default lateral position of the autonomous driving vehicle, and at least one user interface, arranged to receive an input indicative of an off-set of the lateral position of the autonomous driving vehicle from a user of the autonomous driving vehicle, wherein the processor circuitry is arranged to receive, from the at least one user interface, information regarding the off-set of the lateral position of the autonomous driving vehicle during driving in the lateral position, calculate a maximum right and a maximum left off-set of the lateral position, wherein the at least one processor circuitry is arranged to continuously set the maximum right and the maximum left off-set of the lateral position at least based on data generated by the autonomous driving vehicle, and wherein the data generated by the autonomous driving vehicle is one or more of a shoulder width, a road curvature, curbs, visibility, a potential threat in the path in the lane or adjacent to the lane, a geographical position, a speed limit of the road, hidden curves, crests hiding oncoming traffic, existence of oncoming traffic and road conditions, calculate a dynamic off-set value based on the received off-set and the maximum right and the maximum left off-set, adjust the lateral position of the vehicle based on the off-set information, and control the lateral position of the autonomous driving vehicle at least based on the dynamic off-set value and the default lateral position of the autonomous driving vehicle, wherein the user interface is arranged to communicate a geographical position or a driving scenario of the autonomous driving vehicle to a cloud service and receive, from the cloud service, information indicative of an off-set of the lateral position and/or the dynamic off-set value, wherein the off-set information is based on a plurality of drivers desired lateral positions weighed together and/or a plurality of drivers dynamic off-set values weighed together for the given geographical position or the driving scenario and the processor circuitry is arranged to adjust the lateral position of the autonomous driving vehicle during autonomous driving based on a combination of the default lateral position, the off-set of the lateral position, the dynamic off-set value and the off-set information received from the cloud service, and wherein the processor circuitry is arranged to receive, from the cloud service, an updated default lateral position of the autonomous driving vehicle and to replace the default lateral position with the updated default lateral position.

2. The autonomous driving vehicle according to claim 1, wherein the dynamic off-set value is a percentage of the maximum right and the maximum left off-set.

3. The autonomous driving vehicle according to claim 1, wherein the off-set information of the off-set of the lateral position comprise data of a distance from the default lateral position corresponding to the lateral position of the autonomous driving vehicle that the autonomous driving vehicle should be adjusted to.

4. The autonomous driving vehicle according to claim 1, wherein the off-set information of the off-set of the lateral position comprise data of a lateral direction from the default lateral position corresponding to the lateral position of the autonomous driving vehicle that the autonomous driving vehicle should be adjusted to.

5. The autonomous driving vehicle according to claim 1, wherein the received off-set information of the lateral position is limited to be between the maximum right and the maximum left off-set of the lateral position.

6. The autonomous driving vehicle according to claim 1, wherein the at least one processor circuitry is arranged to store a plurality of off-set information, which are associated to different driving scenarios determined at least based on data generated by the autonomous driving vehicle.

7. The autonomous driving vehicle according to claim 1, wherein the data generated by the autonomous driving vehicle is generated by one or more of a sensor, a radar, a laser light, a positioning system such as a GPS, a odometer and a computer vision system.

8. The autonomous driving vehicle according to claim 1, wherein the at least one user interface is one or more of a steering wheel of the vehicle, a touch screen, a gesture sensor, a voice sensor, a motion sensor, buttons on the steering wheel and buttons.

9. The autonomous driving vehicle according to claim 1, wherein the user interface is configured to receive the input indicative of the off-set of the lateral position in a number of discrete steps.

10. The autonomous driving vehicle according to claim 1, wherein the user interface is configured to receive the input indicative of the off-set of the lateral position as continuous steps.

11. The autonomous driving vehicle according to claim 1, wherein the processor circuitry is arranged to replace the default lateral position of the autonomous driving vehicle in a memory to be the default lateral position of the autonomous driving vehicle adjusted by the dynamic off-set value.

12. The autonomous driving vehicle according to claim 1, wherein the processor circuitry is arranged to store the input indicative of the off-set of the lateral position and/or the dynamic off-set value received from a specific user of the autonomous driving vehicle in the memory as the default lateral position of the autonomous driving vehicle for the specific user of the autonomous driving vehicle.

13. The autonomous driving vehicle according to claim 1, wherein the processor circuitry is arranged to store the input indicative of the off-set of the lateral position and/or the dynamic off-set value received from a user of the autonomous driving vehicle for one or more of a specific geographical position of the autonomous driving vehicle, a type of road, the width of the road, number of lanes, roundabouts, visibility, time, weather, a presence of a roadside, driving in ques in the memory as the default lateral position of the vehicle for the specific geographical position of the vehicle.

14. An autonomous driving vehicle, comprising at least one processor circuitry, arranged to control a lateral position of the autonomous driving vehicle during autonomous driving of the autonomous driving vehicle at least based on a default lateral position of the autonomous driving vehicle, and at least one user interface, arranged to receive an input indicative of an off-set of the lateral position of the autonomous driving vehicle from a user of the autonomous driving vehicle, wherein the processor circuitry is arranged to receive, from the at least one user interface, information regarding the off-set of the lateral position of the autonomous driving vehicle during driving in the lateral position, calculate a maximum right and a maximum left off-set of the lateral position, calculate a dynamic off-set value based on the received off-set and the maximum right and the maximum left off-set, adjust the lateral position of the vehicle based on the off-set information, and control the lateral position of the autonomous driving vehicle at least based on the dynamic off-set value and the default lateral position of the autonomous driving vehicle, wherein the user interface is configured to receive an intentional input indicative of the satisfaction of the lateral position from the user of the autonomous driving vehicle, wherein the user interface is configured for receiving intentional input indicative of the user's satisfaction by detecting the user's input on a touch screen, the user's input via a gesture sensor or voice sensor or motion sensor, or the user's actuation of a push button, wherein the processor circuitry is configured to use this intentional input to amplify the lateral positions that are perceived as satisfactory, and wherein the processor circuitry is configured to further base the lateral position of the autonomous driving vehicle on the intentional input indicative of the satisfaction of the lateral position, wherein the at least one processor circuitry is arranged to continuously set the maximum right and the maximum left off-set of the lateral position at least based on data generated by the autonomous driving vehicle, and wherein the data generated by the autonomous driving vehicle is one or more of curbs, visibility, a potential threat in the path in the lane or adjacent to the lane, a speed limit of the road, hidden curves, crests hiding oncoming traffic, existence of oncoming traffic and road conditions.

15. The autonomous driving vehicle according to claim 14, wherein the dynamic off-set value is a percentage of the maximum right and the maximum left off-set.

16. The autonomous driving vehicle according to claim 14, wherein the off-set information of the off-set of the lateral position comprise data of a distance from the default lateral position corresponding to the lateral position of the autonomous driving vehicle that the autonomous driving vehicle should be adjusted to.

17. The autonomous driving vehicle according to claim 14, wherein the off-set information of the off-set of the lateral position comprise data of a lateral direction from the default lateral position corresponding to the lateral position of the autonomous driving vehicle that the autonomous driving vehicle should be adjusted to.

18. A method for controlling a lateral position of an autonomous driving vehicle, comprising at least one processor circuitry and a user interface, comprising the steps of:

controlling, by the processing circuitry, the lateral position of the autonomous driving vehicle, receiving, via the user interface, during autonomous driving of the autonomous driving vehicle an input indicative of an off-set of the lateral position of the autonomous driving vehicle from a user of the autonomous driving vehicle, receiving, via the user interface, during autonomous driving of the autonomous driving vehicle an intentional input indicative of the satisfaction of the lateral position from the user of the autonomous driving vehicle, wherein the user interface receives the intentional input indicative of the user's satisfaction by detecting the user's input on a touch screen, the user's input via a gesture sensor or voice sensor or motion sensor, or the user's actuation of a push button, calculating a maximum right and a maximum left off-set of the lateral position, wherein the at least one processor circuitry is arranged to continuously set the maximum right and the maximum left off-set of the lateral position at least based on data generated by the autonomous driving vehicle, and wherein the data generated by the autonomous driving vehicle is one or more of curbs, visibility, a potential threat in the path in the lane or adjacent to the lane, a speed limit of the road, hidden curves, crests hiding oncoming traffic, existence of oncoming traffic and road conditions, calculating a dynamic off-set value based on the received off-set and the maximum right and the maximum left off-set, adjusting, by the processing circuitry, the lateral position of the autonomous driving vehicle based on information regarding the off-set from a default lateral position of the autonomous driving vehicle, and controlling the lateral position of the autonomous driving vehicle at least based on the dynamic off-set value, the default lateral position of the autonomous driving vehicle, and the intentional input indicative of the user's satisfaction of the lateral position.

* * * * *